Jan. 15, 1957  A. V. L. C. DEBRIE  2,777,359
MEANS OF CORRECTING ILLUMINATION FOR PRINTING COLOR FILMS
Filed March 10, 1953
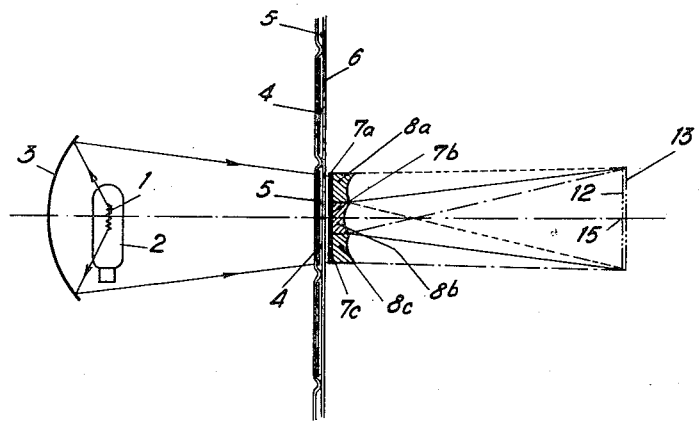
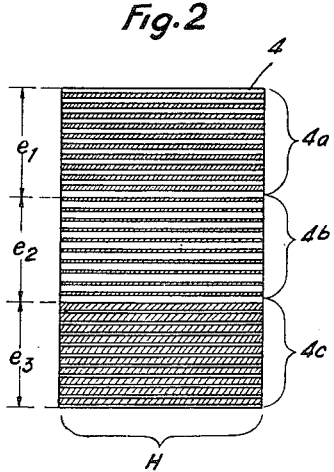
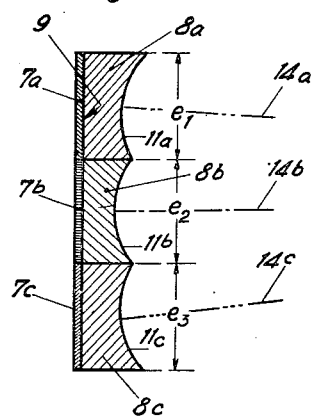
INVENTOR:
ANDRÉ VICTOR LÉON
     CLEMENT DEBRIE
BY:

United States Patent Office 2,777,359
Patented Jan. 15, 1957

2,777,359

MEANS OF CORRECTING ILLUMINATION FOR PRINTING COLOR FILMS

André Victor Leon Clement Debrie, Paris, France

Application March 10, 1953, Serial No. 341,493

Claims priority, application France March 25, 1952

3 Claims. (Cl. 88—24)

It is known that, in printing color films, color correcting filters are interposed into the printing beam of light.

These correcting filters of complementary colors of the dominants to be discarded, have each its characteristics as to shade and intensity. They are selected in a scale of numerous filters and often composed by association, in superposition, of several filters. This selection is very delicate, entirely empirical, and requires a great deal of labor stock, time and skill.

The method of the present invention does away with these shortcomings. It consists in utilizing a beam of light proceeding from a printing lamp, the color temperature of the light of this beam being conveniently adjusted, disposing in this beam three neutral gray filters or equivalents, of opacity accommodated, as will be explained later, to each scene, associated with three colored filters, determined once for all and corresponding each to a fundamental color, and projecting each color beam, thus constituted, in such way as to cause these beams to become superimposed, in the printing window, for the passage of the film to be printed by being illuminated with a light recomposed by addition of these three color beams. The exact shade of this recomposed light depends on the intensity of each elementary color, regulated by the opacity of the neutral gray filters that has preliminarily been selected for each of these beams by viewing a test positive obtained, from the negative of each scene to be printed, with a white light similar to the preceding one, in an appropriate viewing device such as that described by the present applicant in the U. S. A. application filed January 3, 1951, Serial No. 264,749 for: "Method of Continuous Printing of Color Films by Means of a Corrected Light."

The neutral gray filters, associated with the filters of fixed elementary colors, are determined by means of marking the sections of the elementary beams of light whose mixture has given, in comparing to a standard, an ideal vision of the scene under examination, which marking gives directly by reading, on tables or graphs pre-established in a known way, the corresponding values of each of the three corrected printing lights, hence of each corresponding neutral gray filter. These filters, thus predetermined, are disposed, each ahead of the filter of the elementary color whose intensity it regulates, in the common beam proceeding from the printing lamp. Each light of elementary color, in quantity thus regulated is, after each color filter, taken up by an associated optical system that directs each beam onto the film surface to be printed, in a manner to superimpose these beams in the printing window, the three beams of light having a common section in the plane of the film being reproduced, so that the proportions of the various elementary colors, determined by the neutral gray associated with each colored filter, are respectively in the composed light.

The accompanying drawings schematically show, by way of non-limiting example, means for executing the method of the present invention.

In the drawings:

Fig. 1 is a schematic view of an arrangement according to the present invention;

Fig. 2 is a view of the gray filters forming part of the arrangement; and

Fig. 3 is a longitudinal section through the optical system forming also part of the arrangement to the present invention.

The filament 1 of the lamp 2 gives, with the aid of a concave mirror 3, a beam of light uniformly illuminating three neutral gray filters, of predetermined values, placed side by side and carried by a film 4, for example in a pocket 5 of a mask-band 6 of the style for which the applicant has filed, in U. S. A., April 2, 1952, Serial Number 280,054, a patent application for: "Improved Mask-Band for Printer of Cinematographic Films," now abandoned.

The neutral gray filters 4a, 4b, 4c, carried side by side on 4 (Fig. 2), take position exactly in front of the colored filters 7a, 7b, 7c through which thus pass, in determined proportions, monochromatic light rays of the three selected elementary shades whose superposition will give the desired dominant light. The widths $e_1$, $e_2$, $e_3$ of the "neutral gray" filters 4a, 4b, 4c, and those of the colored filters 7a, 7b, 7c are preferably the same for each neutral gray filter and for each corresponding colored filter. Each monochromatic beam of light is taken up by an optical device that directs it in such way as to cause the three beams to be superposed on the surface, to be illuminated, of the film to be reproduced.

In the example shown, the associated optical system is constituted by a block of three divergent cylindric lenses 8a, 8b, 8c whose common plane face 9 carries the monochromatic filters and whose concave faces 11a, 11b, 11c, between the planes perpendicular to the plane of the paper (Fig. 3), are determined in such way as to cause the beams passing therethrough to diverge so that they may have, on the film image 12 to be copied by contacting the film 13, an equal section superposed on this image.

To this end, the concave faces 11a, 11b, 11c, have their planes of symmetry 14a, 14b, 14c (Fig. 3) converging at 15 upon 12 (Fig. 1).

Obviously, in lieu of dosing each monochromatic light by layer filters such as is schematically shown in Fig. 2, it will be possible, without changing the principle of the invention, to utilize ordinary "neutral gray" filters, or even to dose the flux of each monochromatic beam, after crossing of the corresponding filter, by any diaphragm device prior to passage through the optical system.

The optical system employed for superimposing the three monochromatic fluxes may, without departing from the scope of the invention, be different from that illustrated in the drawings; for example, it may be formed with three objectives.

Also, in lieu of the three filters 7a, 7b, 7c associated with the three cylindric lenses 11a, 11b, 11c, respectively, use may be made, for example, of cylindric lenses colored throughout their bodies.

What is claimed is:

1. A film printing apparatus for illuminating a color film image in the plane of the latter with corrected light, comprising, in combination, a printing lamp means for directing a beam of light in a predetermined direction; a neutral-filter holding means having opposite side walls positioned substantially normal to and in the path of said beam of light and through which the light freely passes; three neutral gray filters arranged edge-to-edge and having plane faces normal to said light beam between said opposite side walls of said holding means, said neutral filters being constituted by alternate layers of opaque and transparent elements of predetermined thickness, so that the intensity of light flux passing through said neutral filters depends on the relative thicknesses of said opaque and transparent layers respectively; three color filters, each being colored with one of the elementary colors respectively, and each being aligned, in the path of said light beam, with one of said neutral filters respectively and presenting substantially the same cross-sectional area normal to the light beam as said neutral filters respectively, so that three monochromatic beams of light, each regulated as regards intensity, issue beyond each of said aligned neutral and color filters respectively after having passed therethrough; and three light diverging means positioned, with respect to said lamp means, beyond said neutral and color filters, each of said light diverging means being aligned respectively with one of said color filters for superposing said monochromatic beams of light in the plane of the film image, said light diverging means consisting of planar-concave cylindric lenses arranged adjacent one another and having their plane faces arranged in a common plane, said plane faces being directed towards said lamp means.

2. A film printing aparatus for illuminating a color film image in the plane of the latter with corrected light, comprising, in combination, a printing lamp means for directing a beam of light in a predetermined direction; a neutral-filter holding means having opposite side walls positioned substantially normal to and in the path of said beam of light and through which the light freely passes; three neutral gray filters arranged edge-to-edge and having plane faces normal to said light beam between said opposite side walls of said holding means, said neutral filters being constituted by alternate layers of opaque and transparent elements of predetermined thickness, so that the intensity of light flux passing through said neutral filters depends on the relative thicknesses of said opaque and transparent layers respectively; three color filters, each being colored with one of the elementary colors respectively, and each being aligned, in the path of said light beam, with one of said neutral filters respectively and presenting substantially the same cross-sectional area normal to the light beam as said neutral filters respectively, so that three monochromatic beams of light, each regulated as regards intensity, issue beyond each of said aligned neutral and color filters respectively after having passed therethrough; and three light diverging means positioned, with respect to said lamp means, beyond said neutral and color filters, each of said light diverging means being aligned respectively with one of said color filters for superposing said monochromatic beams of light in the plane of the film image, said light diverging means consisting of planar-concave cylindric lenses arranged adjacent one another and having their plane faces arranged in a common plane, said plane faces being directed towards said lamp means, said colored filters respectively being fixed to the plane faces of said cylindric lenses.

3. A film printing apparatus for illuminating a color film image in the plane of the latter with corrected light, comprising, in combination, a printing lamp means for directing a beam of light in a predetermined direction; a neutral-filter holding means having opposite side walls positioned substantially normal to and in the path of said beam of light and through which the light freely passes; three separate neutral gray filters each having predetermined light filtering characteristics, being arranged edge-to-edge and having plane faces normal to said light beam between said opposite side walls of said holding means, said neutral filters being constituted by alternate layers of opaque and transparent elements of predetermined thickness, so that the intensity of said light flux passing through said neutral filters depends on the relative thicknesses of said opaque and transparent layers respectively; and three optical light diverging-color filter means consisting of planar concave cylindric lenses arranged adjacent one another and having their plane faces arranged in a common plane, said plane faces being directed towards said lamp means, said diverging means being positioned, with respect to said lamp means, beyond said neutral filters and being colored with the elementary colors, respectively, and being aligned in the path of said light beam with said neutral filters, respectively, so that the three monochromatic beams of light issue beyond said aligned neutral and light diverging-color filters, respectively, after having passed therethrough, said monochromatic beams being superposed by said light diverging means in the plane of the film image.

References Cited in the file of this patent

UNITED STATES PATENTS

| | | |
|---|---|---|
| 1,361,012 | Capstaff | Dec. 7, 1920 |
| 1,944,230 | Gregory | Jan. 23, 1934 |
| 2,009,700 | McMurdo | July 30, 1935 |
| 2,117,727 | Jones | May 17, 1938 |
| 2,300,970 | Riess | Nov. 3, 1942 |
| 2,611,294 | Luboshez | Sept. 23, 1952 |

FOREIGN PATENTS

| | | |
|---|---|---|
| 796,677 | France | Jan. 27, 1936 |